(12) United States Patent
Sato et al.

(10) Patent No.: US 8,830,547 B2
(45) Date of Patent: Sep. 9, 2014

(54) AUTHENTICATION HOLOGRAM, AND ITS FABRICATION PROCESS

(75) Inventors: Jun Sato, Tokyo (JP); Tsuyoshi Yamauchi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 44 days.

(21) Appl. No.: 13/392,307

(22) PCT Filed: Aug. 25, 2010

(86) PCT No.: PCT/JP2010/005233
§ 371 (c)(1),
(2), (4) Date: Feb. 24, 2012

(87) PCT Pub. No.: WO2011/027514
PCT Pub. Date: Mar. 10, 2011

(65) Prior Publication Data
US 2012/0162731 A1 Jun. 28, 2012

(30) Foreign Application Priority Data

Sep. 1, 2009 (JP) ................. 2009-201603
Aug. 24, 2010 (JP) ................. 2010-186980

(51) Int. Cl.
*G03H 1/00* (2006.01)
*G03H 1/26* (2006.01)
*G03H 1/22* (2006.01)
*B42D 15/00* (2006.01)
*B42D 25/00* (2014.01)

(52) U.S. Cl.
CPC ......... *G03H 1/22* (2013.01); *G03H 2001/0016* (2013.01); *B42D 15/0013* (2013.01); *G03H 2001/2231* (2013.01); *G03H 1/2249* (2013.01); *G03H 2210/30* (2013.01); *B42D 15/105* (2013.01); *G03H 2210/32* (2013.01); *G03H 2001/2236* (2013.01); *G03H 1/0011* (2013.01)
USPC ..................... 359/2; 359/22; 359/32

(58) Field of Classification Search
None
See application file for complete search history.

(56) References Cited

U.S. PATENT DOCUMENTS 7,154,647 B1  12/2006 Takabayashi et al.
2008/0055685 A1* 3/2008 Kodama ........................... 359/2

FOREIGN PATENT DOCUMENTS

| EP | 1045296 A2 | 10/2000 |
|----|-----------|---------|
| JP | 2003-058027 | 2/2003 |
| JP | 2004-094202 A | 3/2004 |
| JP | 2005-049675 | 2/2005 |

OTHER PUBLICATIONS

Chinese Patent Office, "Office Action for CN 201080050417.9", Jul. 18, 2013.
Europe Patent Office, "European Search Report for EP 10813469.3," Feb. 5, 2014.

* cited by examiner

*Primary Examiner* — Jade R Chwasz
(74) *Attorney, Agent, or Firm* — Manabu Kanesaka

(57) ABSTRACT

An authentication hologram uses a Lippmann hologram that enables a 3D object image having a vertical and horizontal field of vision as well as planar with added information viewable at a specific angle alone. In that authentication hologram, a hologram for reconstructing a 3D object image and a hologram mirror pattern that is formed at a pattern portion corresponding to the added information and has planar interference fringes placed one upon another and parallel at a constant spacing are recorded in a superposing fashion.

2 Claims, 14 Drawing Sheets

AUTHENTICATION HOLOGRAM, AND ITS FABRICATION PROCESS

RELATED APPLICATIONS

The present application is National Phase of International Application No. PCT/JP2010/005233 filed Aug. 25, 2010, and claims priority from Japanese Applications No. 2009-201603 filed Sep. 1, 2009 and No. 2010-186980 filed Aug. 24, 2010.

ART FIELD

The present invention relates generally to an authentication hologram and its fabrication process, and more particularly to an authentication hologram making use of a Lippmann hologram and its fabrication process.

BACKGROUND ART

A number of forgery-prevention measures have long been tried for cards like credit cards and cash cards as well as items that need authentication and forgery prevention, such as tradable coupons, IDs and valuable papers. For instance, a credit card has been provided on its surface with a rainbow hologram composed of a relief hologram having a metal reflective layer for visual authentication. However, the relief hologram has been susceptible of forgery because of easy access to material, established mass copying technologies, and so on, often resulting in difficulty in authentication.

With this in mind, a Lippmann hologram is now used as a hologram distinguishable from the relief hologram. Typically, Patent Publication 1 discloses that if a Lippmann hologram with information added to it is fabricated, it becomes easy to tell it from its counterfeit.

LISTING OF THE PRIOR PATENT PUBLICATIONS

Patent Publication 1: JP(A) 2005-49675
Patent Publication 2: JP(A) 6-241888

SUMMARY OF THE INVENTION

Problems to be Solved by the Invention

Referring here to the prior art process set forth in Patent Publication 1, the Lippmann hologram with some information added to it is fabricated using a transparent protective sheet having that added information. However, there is no or little difference between how a 3D objet is seen and how the reconstructed image of the added information is seen; so there is still mounting demand for a hologram capable of telling the 3D object from the added information with greater ease than ever before.

It is thus the primary object of the invention to provide an authentication hologram using a Lippmann hologram, which makes it possible to view a 3D object image having a vertical and horizontal field of vision plus a planar, added information pattern that can be viewed only at a specific angle, and its fabrication process.

Means for Accomplishing the Object

According to the first aspect of the invention, that object is accomplished by the provision of an authentication hologram, characterized in that a hologram for reconstructing a 3D object image and a hologram mirror pattern that is formed at a pattern portion corresponding to added information and comprising planar interference fringes placed one upon another and parallel at a constant spacing are recorded in a superposing fashion.

Desirously in one embodiment of this aspect, the field of vision of the 3D object image be wider than the field of vision of that hologram mirror pattern, and the luminance of that hologram mirror pattern be higher than that of that 3D object image.

In another embodiment of the first aspect, at least one of the 3D object image and the hologram mirror pattern can be viewed as a color image of two or more wavelengths.

In yet another embodiment of the first aspect, the field of vision of the hologram mirror pattern may vary for each wavelength.

According to one embodiment of the second aspect of the invention, there is an authentication hologram fabrication process provided, characterized in that a mask sheet formed of a transparent film having an opaque, added information pattern portion is superposed on a first hologram-recording material; ultraviolet radiation is directed to the first hologram-recording material from the transparent film surface to inactivate the first hologram-recording material except a portion corresponding to the pattern portion, and coherent light is entered in the inactivated, first hologram-recording material from both sides to form a hologram mirror pattern at an activated portion of the first hologram-recording material, thereby defining a hologram mirror pattern master; reconstructing illumination light is directed to a first-stage hologram in which interference fringes of light scattered from and reflected off the 3D object and a first reference light are recorded to generate diffracted light thereby reconstructing an image of the 3D object; the diffracted light and second reference light are co-entered in a second-stage hologram-recording material positioned near the reconstructed image to prepare a second-stage hologram as a 3D object hologram master; another hologram-recording material is positioned above or below an assembly in which the hologram mirror pattern master and the 3D hologram master are in close contact; and illumination light is directed to the assembly from the another hologram-recording material side to cause diffracted light from the hologram mirror pattern master and the 3D object hologram master and the directed illumination light to interfere in the another hologram-recording material.

In this embodiment of the invention, at least one of the hologram mirror pattern master and the 3D object hologram master may be prepared using light of two or more different wavelengths, and light of two or more different wavelengths used as the illumination light entered from the another hologram-recording material side for illumination is concurrently or separately directed to cause interferences in the another hologram-recording material.

According to another embodiment of the second aspect of the invention, there is an authentication hologram fabrication process provided, characterized in that reconstructing illumination light is directed to a first-stage hologram in which interference fringes of scattered from and reflected off a 3D object and first reference light are recorded to generate diffracted light thereby reconstructing an image of the 3D object; the diffracted light and second reference light are co-entered in a second-stage hologram-recording material positioned near the reconstructed image to prepare a second-stage hologram as a 3D object hologram master; a diffraction grating pattern master in which an added information pattern portion is added to a transparent film as a constant-pitch diffracting grating is located in close contact with the 3D object hologram master into an assembly and another hologram-recording material is located above or below the assembly; and illumination light is directed to the another hologram-recording material side to cause diffracted light from the diffraction grating pattern master and the 3D object hologram master and the directed illumination light to interfere in the another hologram-recording material.

In this embodiment of the invention, the 3D object hologram master may be prepared using light of two or more different wavelengths, and light of two or more different wavelengths used as illumination light entered from the another hologram-recording material side for illumination is concurrently or separately directed to cause interferences in the another hologram-recording material.

According to yet another embodiment of the second aspect of the invention, there is an authentication hologram fabrication process provided, characterized in that reconstructing illumination light is directed to a first-stage hologram in which interference fringes of light scattered from and reflected off a 3D object as well as parallel light having a sectional pattern corresponding to added information and first reference light to generate diffracted light thereby reconstructing an image of the 3D object and the parallel light having a sectional pattern corresponding to the added information; the diffracted light and second reference light are co-entered in a second-stage hologram-recording material positioned near the reconstructed image to prepare a second-stage hologram as a 3D object hologram master; and another hologram-recording material is located relative to the 3D object hologram master and illumination light is directed to the another hologram-recording material to cause the diffracted light from the 3D object hologram master and the directed illumination light to interfere in the another hologram-recording material.

In this embodiment of the invention, the 3D object hologram master may be prepared using light of two or more different wavelengths, and light of two or more distinct wavelengths used as illumination light entered from the another hologram-recording material side for illumination is concurrently or separately directed to cause interferences in the another hologram-recording material.

Advantages of the Invention

From comparisons of the inventive authentication hologram with conventional ones, it is found that while taking full advantage of the fact that the Lippmann hologram has a vertical and horizontal field of vision, the added information can be viewed only at a specific angle so that a viewer can easily learn which information corresponds to the added information, so whoever the viewer is can implement authentication with great ease.

MODE FOR CARRYING OUT THE INVENTION

In the authentication hologram of the invention, a hologram master having a 3D object recorded in it and a hologram master having a hologram mirror pattern recorded in it or a master having added information composed of a diffraction grating pattern are superposed one upon another, thereby recording a volume hologram of the 3D object and the hologram mirror pattern in a volume hologram-recording material by a hologram copying method.

The inventive authentication hologram is now explained with reference to some examples.

Figure 1:
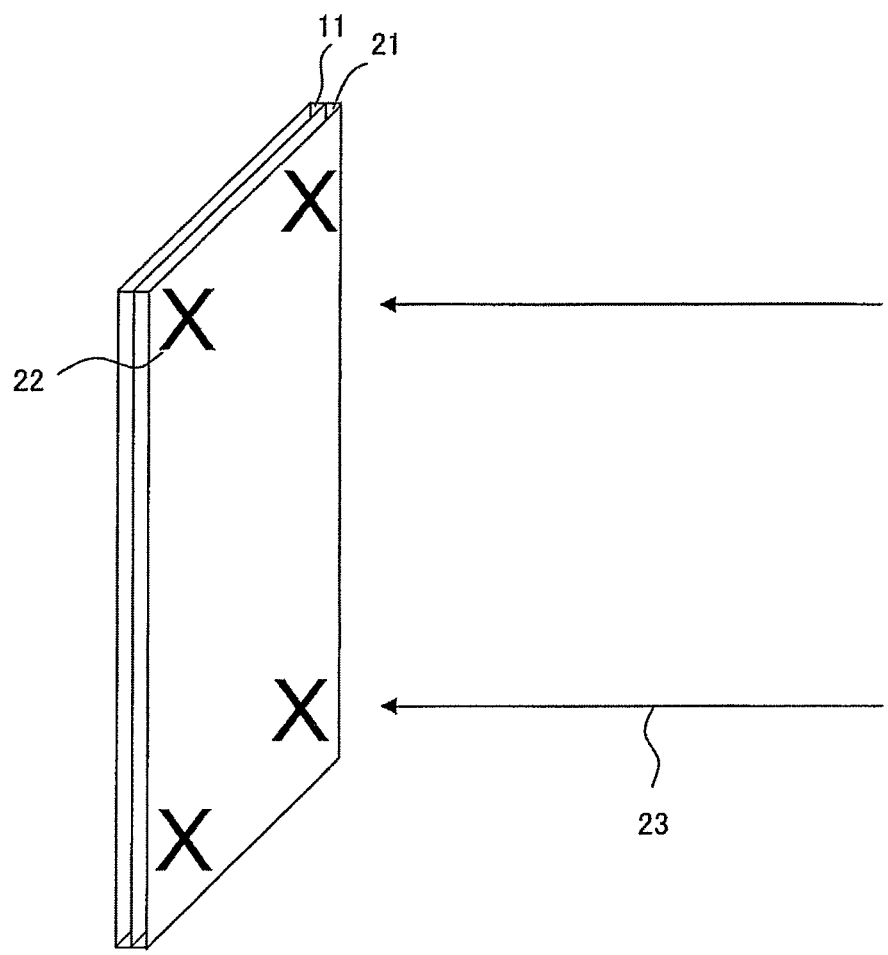
FIG. 1 is illustrative of a pre-processing step for preparing the hologram master having a hologram mirror pattern recorded in it in the authentication hologram fabrication process according to one embodiment of the invention.

FIG. 1 is illustrative of the pre-processing step for preparing the hologram master having the hologram mirror pattern recorded in it. A mask sheet 21 formed of a transparent film on which added information 22 such as characters or patterns, specifically capitals X, X, X and X are opaquely printed or otherwise formed at four corners is superposed on a first volume hologram-recording material 11 such as a photopolymer into an assembly, and ultraviolet radiation 23 is directed to the assembly from the mask sheet 21 side to inactivate areas of the first volume hologram-recording material 11 except pattern portions corresponding to the added information 22.

Figure 2:
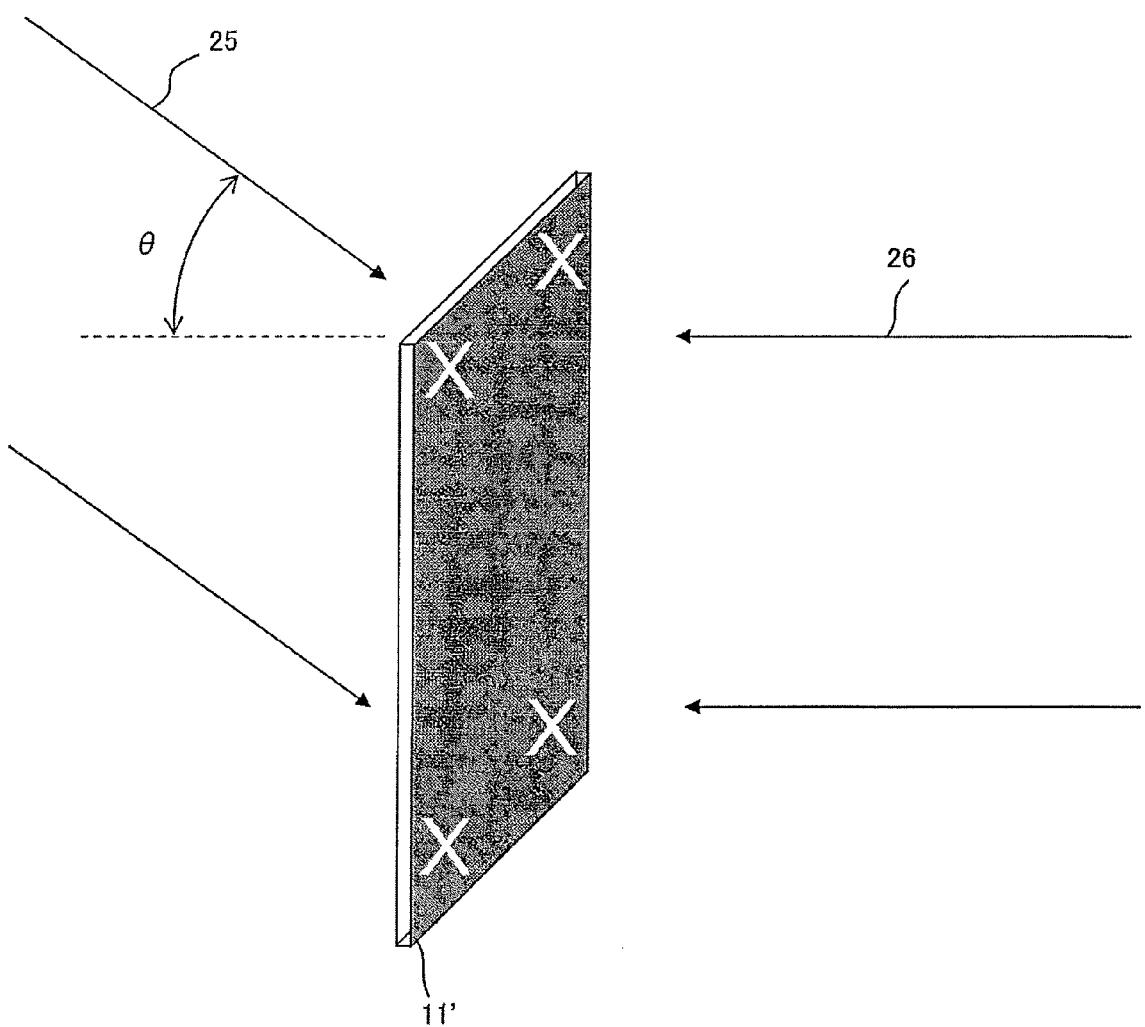
FIG. 2 is illustrative of the step that is implemented after the step of FIG. 1 to form planar interference fringes in the volume hologram-recording material.

FIG. 2 is illustrative of the step of forming planar interference fringes in the first volume hologram-recording material going through the step of FIG. 1, here indicated by 11, in which only the pattern portions corresponding to the added information 22 remain as active areas. Reference light 25 is entered in the volume hologram-recording material 11 from its one side at a specific azimuth angle (from above in FIG. 2)

and a given angle of incident θ and, at the same time, illumination light 26 is entered in the volume hologram-recording material 11 at any angle of incidence for interference, whereby planar interference fringes put one upon another and parallel at a constant spacing are formed in the pattern portions (active area) of the volume hologram-recording material 11 corresponding to the added information 22. The post-exposure volume hologram-recording material 11 is then heated and irradiated with ultraviolet radiation to prepare a hologram mirror pattern master, here indicated by 11. It is here to be noted that the planar interference fringes are defined by a plane that is vertical to a plane including the reference light 25 and the illumination light 26 and includes a bisector for the reference light 25 and the illumination light 26, called the hologram mirror.

Figure 3:
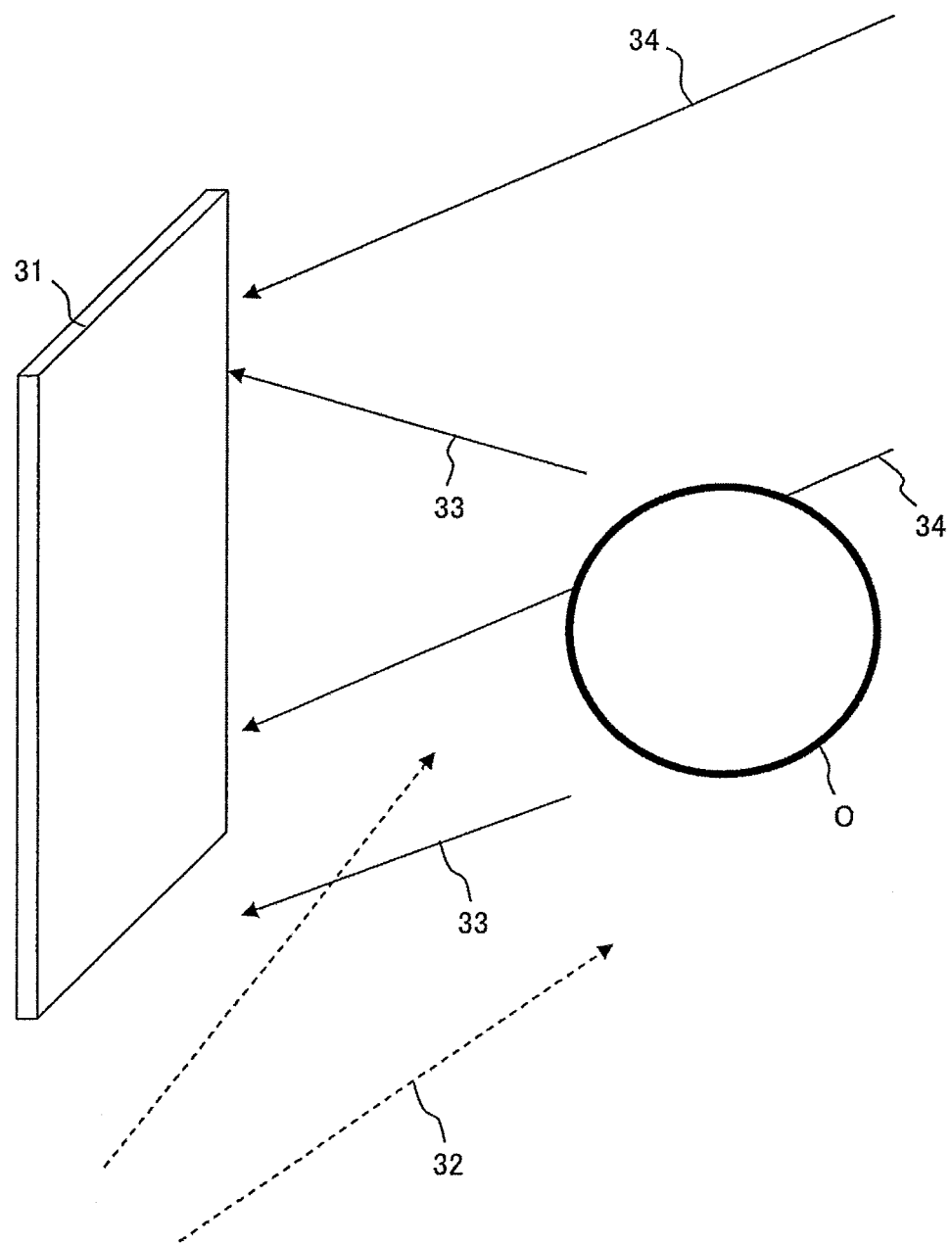
FIG. 3 is illustrative of a recording arrangement for preparing the first-stage hologram in the case where a 3D object is used to prepare a volume hologram by the two-step method.

FIG. 3 is illustrative of a recording arrangement for preparing a first-stage hologram (hereinafter called the H1 hologram) for preparing a volume (Lippmann) hologram by the two-step method using a three-dimensional object O. In the example here, a hologram recording-material 31 composed of a silver halide material that is higher in sensitivity than the photopolymer is used as the H1 hologram-recording material. First, the hologram-recording material 31 is located facing the 3D object O to be recorded in it. The 3D object O is illuminated with illumination light 32 of a given wavelength to cause light scattered from and reflected off the 3D object O to enter the hologram-recording material 31 as object light 33. At the same time, reference light 34 comprising parallel length that comes from the same light source and is coherent with the object light 33 is incident on the same surface of the hologram-recording material 31 for interference with the object light 33 thereby exposing the hologram of the 3D object O on the H1 hologram-recording material 31. The hologram-recording material 31 to which the H1 hologram has thus been exposed is then developed and bleached to prepare the H1 hologram 31.

Figure 4:
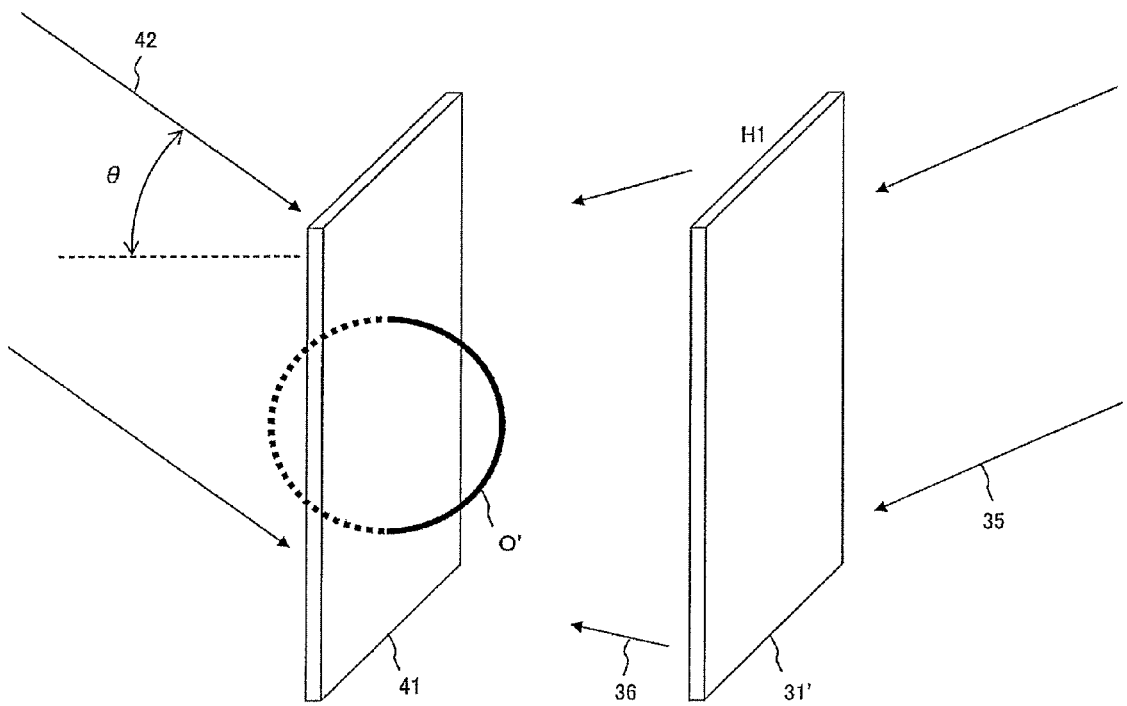
FIG. 4 is illustrative of a recording arrangement for using the first-stage hologram of FIG. 3 to prepare the second-stage hologram.

Then, illumination light 35 that travels opposite in direction to the reference light 34 applied for recording is entered in the H1 hologram from its side opposite to the side from which the reference light 34 at the time of recording the H1 hologram 31 is incident, as shown in FIG. 4, whereupon an image O of the 3D object O is reconstructed and formed by diffracted light 36 in the same position as the relative position of the 3D object O recorded in the surface of the H1 hologram 31. A two-stage hologram (hereinafter called the H2 hologram) recording material 41 comprising a volume hologram-recording material is located near the position where the reconstructed image O of the 3D object O is formed, and reference light 42 comprising parallel light that comes from the same light source and is coherent with the illumination light 35 is co-entered in the hologram-recording material 41 from its side, opposite to the side from which the diffracted light 36 is incident, at a given angle of incidence θ to expose the second-stage H2 hologram to the hologram-recording material 41. In this example, the photopolymer is used as the second-stage hologram-recording material 41. Then, the post-exposure hologram-recording material 41 is heated and irradiated with ultraviolet radiation to prepare an H2 hologram 41. It is here desired that the angle of incidence θ of the reference light 42 incident on the second-stage hologram-recording material 41 be the same as the angle of incidence θ of the reference light 25 in FIG. 2. The H2 hologram 41 prepared through the step of FIG. 4 is here called as a 3D object hologram master 41.

Figure 5:
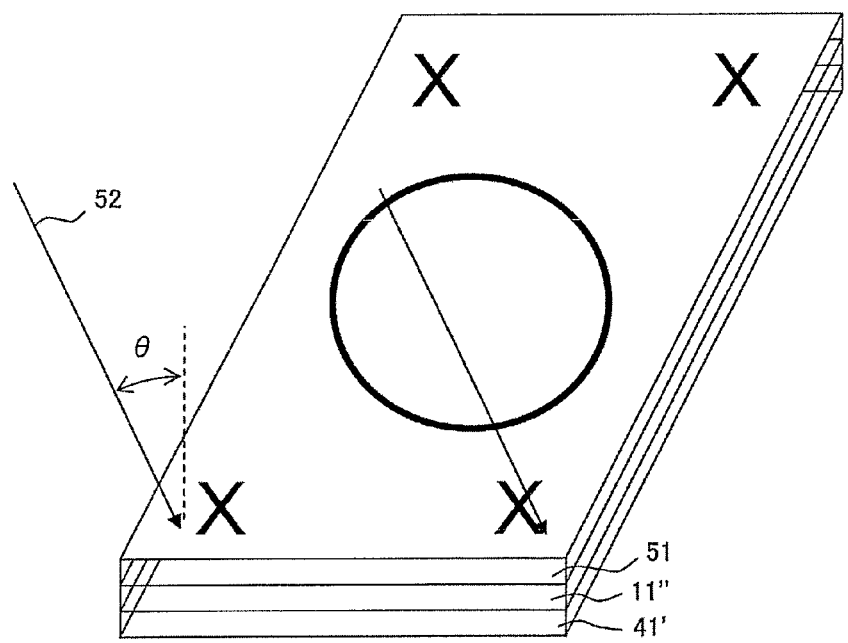
FIG. 5 is illustrative of a recording arrangement for superposing the hologram mirror pattern master and the 3D object hologram master one upon another to fabricate the authentication hologram.

FIG. 5 is illustrative of a recording arrangement for fabricating the authentication hologram in which the hologram mirror pattern master 11 prepared through the step of FIG. 2 is superposed on the 3D object hologram master 41 prepared through the step of FIG. 4. More specifically, the hologram mirror pattern master 11 in which a hologram mirror pattern configured (or contoured) in such a way as to match the added information 22 is recorded is brought in close contact with the 3D object hologram master 41 having the 3D object O recorded in it with an index matching liquid sandwiched between them into an assembly, and the volume hologram-recording material 51 is located on that assembly in close contact with or in proximity to it. It is then desired that both masters 11 and 41 be aligned and superposed one upon another such that the azimuth angle direction of incidence of the reference light 25 in FIG. 2 is in alignment with the azimuth angle direction of incidence of the reference light 42 in FIG. 4. The order of superposition may be such that the master 11 is on the master 41 as shown (on the volume hologram-recording material 51 side), or the master 41 is on the master 11. In this state, from the volume hologram-recording material 51, the reference light 25, the reference light 25 that has the same angle of incidence θ as the reference light 42, and the illumination light 52 that travels opposite direction to the reference light 42 are directed for interference in the volume hologram-recording material 51 of diffracted light that is diffracted from the hologram mirror pattern master 11 and travels opposite in direction to the illumination light 26 and diffracted light that is diffracted from the 3D object hologram master 41 and travels opposite in direction to the object light 33 with the incoming illumination light 52, and post-treatments such as heating and ultraviolet irradiation are implemented to obtain the inventive authentication hologram in complete form.

The inventive authentication hologram thus recorded in the volume hologram-recording material 51 enables the 3D object O to be viewed in a wide vertical and horizontal field of vision. In addition, as is the case with the hologram mirror pattern master 11 of FIG. 2, a hologram mirror in which planar interference fringes lie mutually at a constant spacing and parallel in the thickness direction is recorded only in the capital portions X, X, X and X corresponding to the added information, with the outer edge of that hologram mirror defining a character pattern. Upon illuminated by extraneous light, this hologram mirror pattern enables the extraneous light to be strongly reflected by diffraction in a given direction alone, and the hologram mirror pattern is narrower in the field of vision than the 3D object O, and much higher in luminance than the reconstructed image of the 3D object O instead. For this reason, as the inventive authentication hologram keeps inclining under illumination light, it will give off a momentary flash in a certain position, that is, in a position where the hologram mirror pattern lies in a given direction relative to a viewer, and at the next angle of inclination reached, what is seen will be only the image of the 3D object O, because it is no longer capable of satisfying the reflection conditions.

For that reason, the inventive authentication hologram enables the angle of inclination to be continuously varied as the viewer keeps viewing the image of the 3D object reconstructed so that whoever the viewer is can easily implement authentication depending on whether or not the given added information pattern gives off a momentary flash on the hologram surface.

Another example wherein an authentication hologram similar to that obtained by such a fabrication process shown in FIGS. 1 to 5 is fabricated by the two-step method is now explained with reference to FIGS. 6 to 8.

Figure 6:
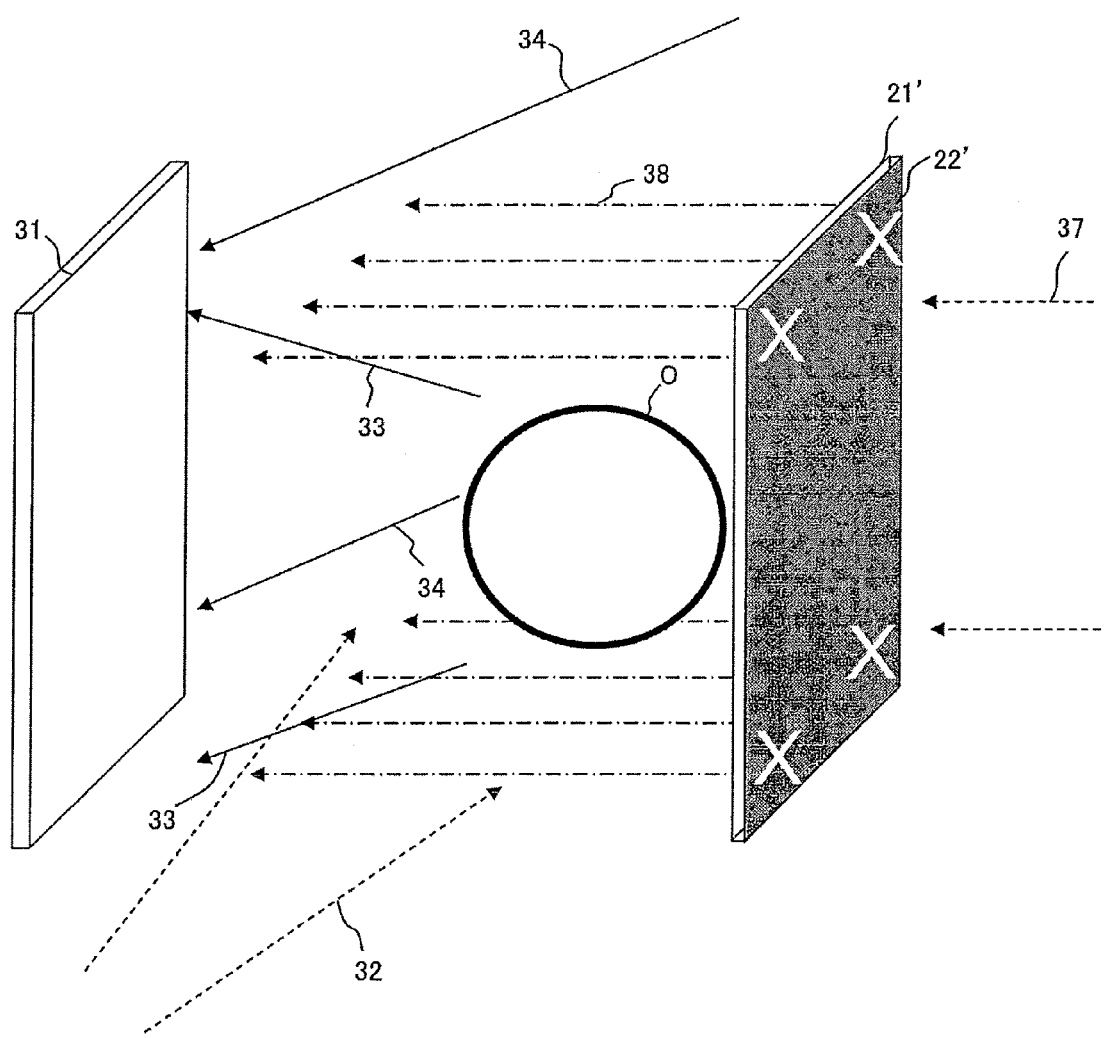
FIG. 6 is illustrative of a recording arrangement for preparing the first-stage hologram in the case where a 3D object and a mask sheet are used to prepare a volume hologram by the two-step method in another example.

FIG. 6 is illustrative of a recording arrangement for preparing a first-stage hologram (hereinafter called the H1 hologram) in this another example in which a 3D object O and a mask sheet 21 are used to prepare a volume (Lippmann) hologram by the two-step method. As is the case with the examples of FIGS. 1 to 5, a hologram-recording material 31 comprising a silver halide material that is higher in sensitivity than the photopolymer is used as an H1 hologram-recording material 31. First, that hologram-recording material 31 is located facing a 3D object O to be recorded in it, and a mask sheet 21 is located near the 3D object O (FIG. 6 shows that the recording material 31 is located behind the object O; however, it may be located around or in front of the 3D object O). This mask sheet 21 is reverse to the mask sheet 21 of FIG. 1 in terms of the positions of the transparent and opaque portions: added information 22 such as characters or patterns on a generally opaque film (sheet member), specifically capital X, X, X and X portions at four corners surrounding the 3D object O define transparent pattern areas.

In such an arrangement, the 3D object O is illuminated with illumination light 32 of a given wavelength to enter light scattered from and reflected off the 3D object O in the hologram-recording material 31 as object light 33. At the same time, the mask sheet 21 is illuminated from behind with parallel illumination light 37 that comes from the same light source with the same wavelength to enter the light scattered from and reflected off the 3D object O in the hologram-recording material 31 together with parallel transmitted light 38 through the transparent pattern areas of the mask sheet 21 defined by the added information 22. The parallel transmitted light 38 is incident on the hologram-recording material 31 in an illuminating area having the same form as the added information 22. Simultaneously with the incidence of the object light 33 and the parallel transmitted light 38 on the hologram-recording material 31, reference light 34 comprising parallel light 34 that is coherent with the object light 33 and the parallel transmitted light 38 and comes from the same light source is incident on the same surface of the hologram-recording material 31 for interference, whereby the hologram of the 3D object O is exposed, together with a hologram mirror pattern corresponding to the added information 22 on the mask sheet 21, to the H1 hologram-recording material 31. The hologram-recording material 31 to which the H1 hologram has thus been exposed is developed and bleached to prepare an H1 hologram 31.

Then, illumination light 35 that travels opposite in direction to the reference light 34 applied for recording is entered in the H1 hologram from its side opposite to the side from which the reference light 34 applied for the recording of the H1 hologram 31 is incident, as shown in FIG. 4, whereupon an image O of the 3D object is reconstructed and formed by diffracted light 36 in the same position as the relative position of the 3D object O recorded in the surface of the H1 hologram 31. At the same time, parallel diffracted light 39 is diffracted from a portion of the hologram mirror pattern of the mask sheet 21 defined by the added information 22, which light 39 has a sectional pattern (the same pattern as the added information on the mask sheet 21) similar to that of the parallel transmitted light 38. A two-stage hologram (hereinafter called the H2 hologram) recording material 41 comprising a volume hologram-recording material 4 is located near the position where the reconstructed image O of the 3D object O is formed, and reference light 42 comprising parallel light that comes from the same light source and is coherent with the illumination light 35 is co-entered in the hologram-recording material 41 from its side, opposite to the diffracted light 36, at a given angle of incidence θ to expose the second-stage H2 hologram to the hologram-recording material 41. In this example, the photopolymer is used as the second-stage hologram-recording material 41, as is the case with the example of FIGS. 1 to 5. Then, the post-exposure hologram-recording material 41 is heated and irradiated with ultraviolet radiation to prepare a H2 hologram 41. The H2 hologram 41 prepared through the step of FIG. 7 is here called as a 3D object hologram master 41.

Figure 7:
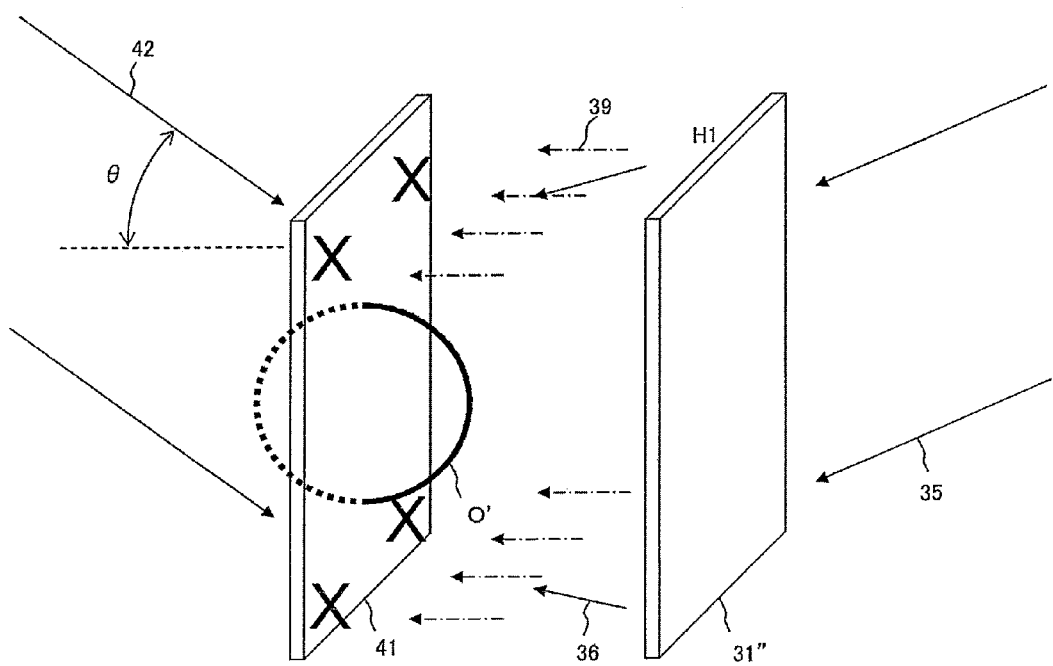
FIG. 7 is illustrative of a recording arrangement for preparing the second-stage hologram using the first-stage hologram of FIG. 6.
Figure 8:
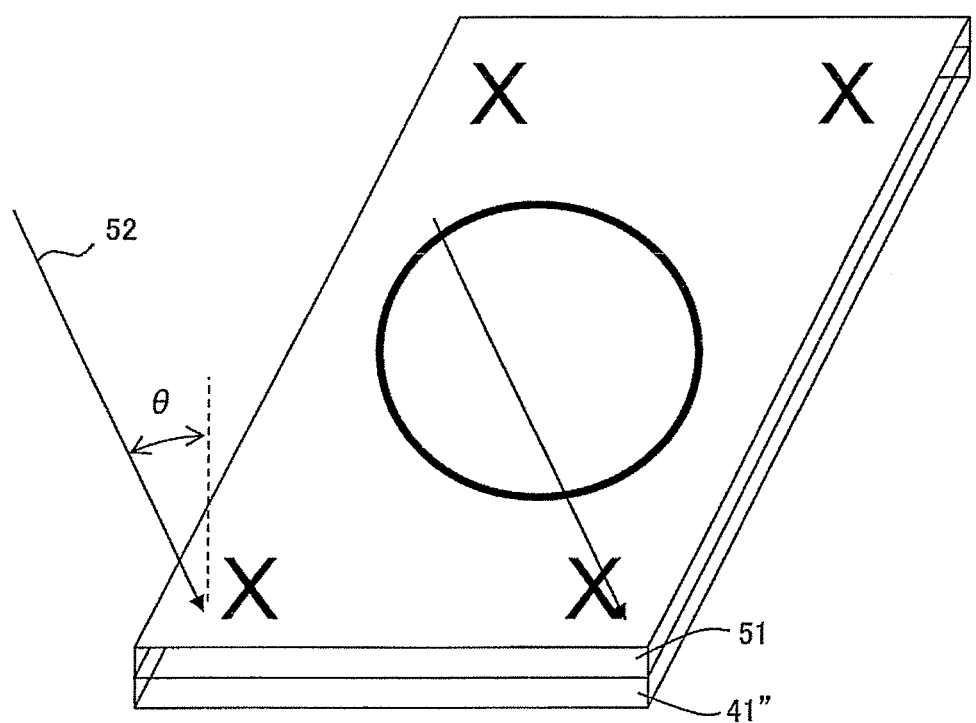
FIG. 8 is illustrative of a recording arrangement for preparing the authentication hologram using a 3D object hologram master having a hologram mirror pattern recorded in it.

FIG. 8 is illustrative of a recording arrangement for fabricating the authentication hologram in which a volume hologram recording material is superposed on the 3D object hologram master 41 prepared through the step of FIG. 7. More specifically, a volume hologram-recording material 51 in which a 3D object O and a hologram mirror pattern configured (or contoured) in such a way as to match added information 22 are recorded is on the 3D object hologram master 41 in close contact with or in proximity to it. In that state, illumination light 52 that travels opposite in direction to reference light 42 is directed to the volume hologram-recording material 51 side at the same angle of incidence θ as the reference light 42 for interference in the volume hologram-recording material 51 of diffracted light that travels opposite in direction to the parallel diffracted light 39 diffracted from the hologram mirror pattern of the 3D object hologram master 41 and diffracted light that travels opposite in direction to the object light 33 from the 3D object O with incoming illumination light 52, and post-treatments such as heating and ultraviolet irradiation are implemented to obtain another inventive authentication hologram in complete form.

Throughout the examples so far described, the position where the added information in the hologram mirror pattern formed in the volume hologram-recording material 51 is visible lies on the hologram surface; that is, the position of the added information relative to the reconstructed image of the 3D object can be determined depending on whether the reconstructed image of the 3D object is positioned above or below the hologram surface.

Figure 9:
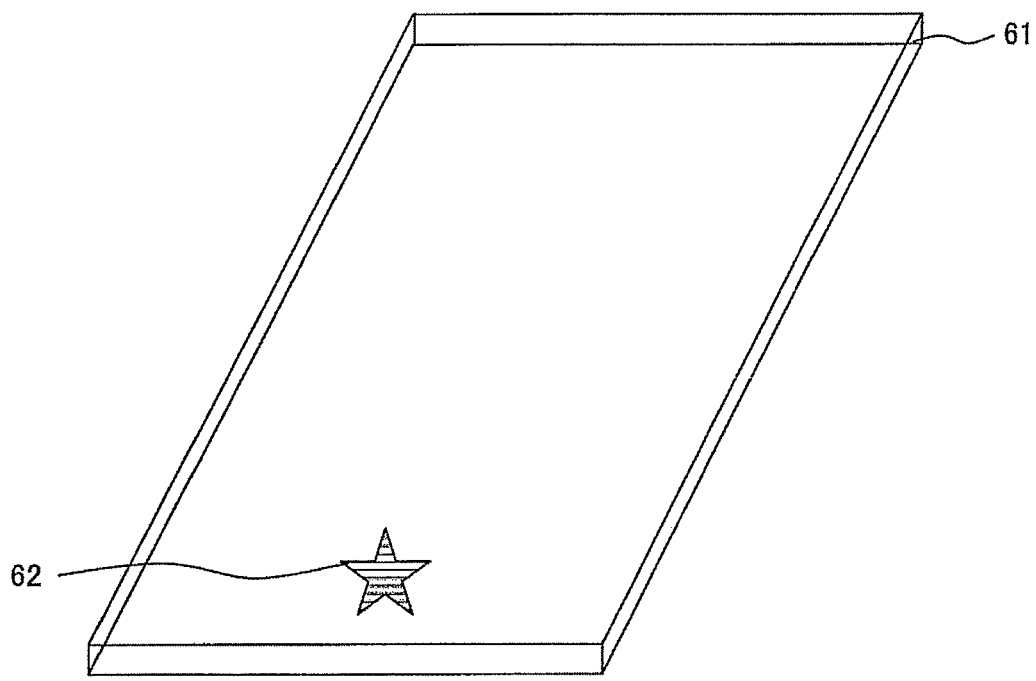
FIG. 9 is illustrative of the diffracting grating pattern master used in yet another example of fabricating the authentication hologram.

A further example of fabricating the inventive authentication hologram is now explained. As shown in FIG. 9, there is the provision of a constant-pitch diffraction grating pattern master 61 in which added information in the form of characters or patterns is notched in a transparent film for diffraction, for instance, a constant-pitch diffraction grating pattern 62 having a star contour is notched in it. It here desired that the diffraction grating pattern 62 be of a refractive index profile type that brings about diffraction even when an index matching liquid contacts its surface or, alternatively, an amplitude type.

Figure 10:
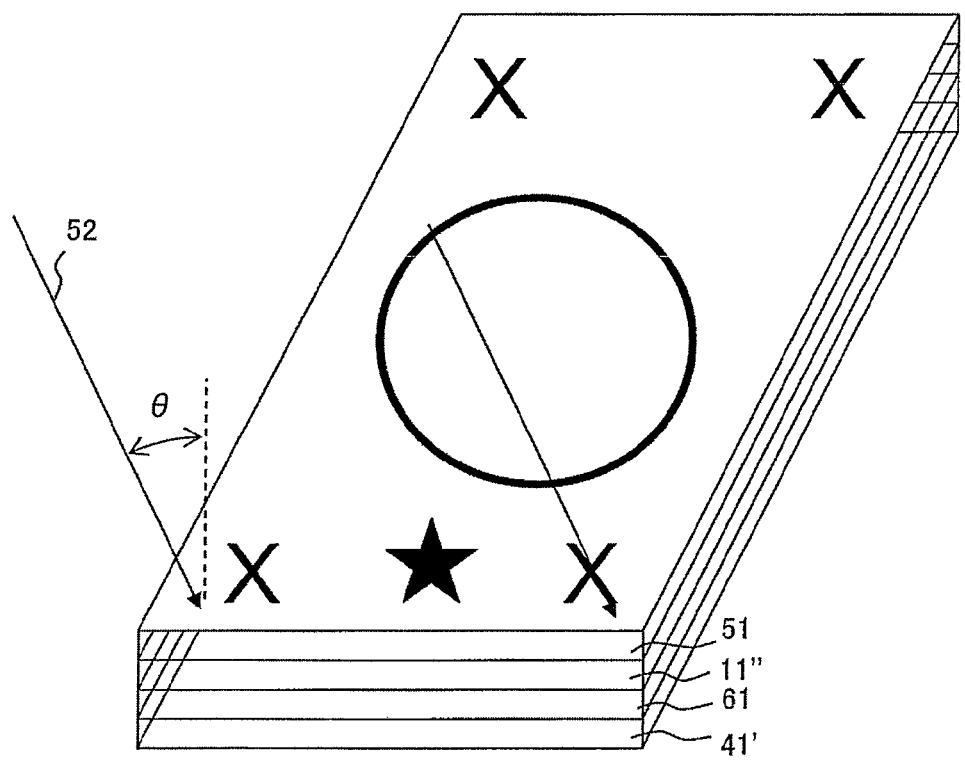
FIG. 10 is illustrative of a recording arrangement for superposing the hologram mirror pattern master, the diffracting grating pattern master and the 3D object hologram master one upon another to prepare the authentication hologram.

As is the case with the example of FIG. 5, the hologram mirror pattern master 11 prepared through the step of FIG. 2, the aforesaid diffraction grating pattern master 61 and the 3D object hologram master 41 prepared through the step of FIG. 4 are superposed one upon another with an index matching liquid between them into an assembly, as shown in FIG. 10, and the volume hologram-recording material 51 is located on that assembly in close contact with or in proximity to it. It is then desired that alignment be implemented such that the azimuth angle direction of incidence of the reference light 25 in FIG. 2 coincides with that of incidence of the reference light 25 in FIG. 4, and the diffraction grating of the diffraction grating pattern in the diffraction grating pattern master 61 be substantially orthogonal to that azimuth angle direction. The order of superposition of the masters 11, 61 and may be optional (in FIGS. 10, 11, 61 and 41 in order from above). In this state, from the volume hologram-recording material 51 side, the reference light 25, the reference light 25 that has the same angle of incidence θ as the reference light 42, and the illumination light 52 that travels opposite direction to the reference light 42 are directed for interference in the volume hologram-recording material 51 of diffracted light that is diffracted from the hologram mirror pattern master 11 and travels opposite in direction to the illumination light 26, diffracted light that is diffracted at the diffraction grating pattern 62 and diffracted light that is diffracted from the 3D object hologram master 41 and travels opposite in direction to the object light 33 with the incoming illumination light 52, and post-treatments such as heating and ultraviolet irradiation are implemented to obtain yet another inventive authentication hologram in complete form.

This inventive authentication hologram enables the image of the 3D object O to be viewed in a wide vertical and horizontal field of vision. In addition, as is the case with the hologram mirror pattern master 11 of FIG. 2, a hologram mirror in which planar interference fringes lie mutually at a constant spacing and parallel in the thickness direction is recorded only at the capital portions X, X, X and X corresponding to the added information 22, with the outer edge of that hologram mirror defining a character pattern. To add to this, a hologram mirror in which planar interference fringes lies mutually at a constant space and parallel in the thickness direction is recorded only in a star pattern portion corresponding to added information 62, with the outer edge of that hologram mirror defining a star pattern. Upon illuminated by extraneous light, those hologram mirror patterns enable the extraneous light to be strongly reflected by diffraction in a given direction alone, and each hologram mirror pattern is narrower in the field of vision than the 3D object O, and much higher in luminance than the reconstructed image of the 3D object O instead. For this reason, as the inventive authentication hologram keeps inclining under illumination light, it will give off a momentary flash in a certain position, that is, in a position where the hologram mirror pattern lies in a given direction relative to a viewer, and at the next angle of inclination reached, what is seen will be only the image of the 3D object O, because it is no longer capable of satisfying the reflection conditions.

For that reason, the inventive authentication hologram enables the angle of inclination to be continuously varied as the viewer keeps viewing the image of the 3D object reconstructed so that whoever the viewer is can easily implement authentication depending on whether or not the given added information gives off a momentary flash on the hologram surface.

Referring again to the arrangement of FIG. 10, it is noted that a similar authentication hologram may be obtained even when the 3D object hologram master 41 prepared through the step of FIG. 7 is used instead of the hologram mirror pattern master 11 and the 3D object hologram master 41.

It is here noted that if, in the arrangement of FIG. 10, the diffraction grating pattern master 61 and the 3D object hologram master 41 are superposed one upon another without recourse to the hologram mirror pattern master 11 into an assembly and the volume hologram-recording material 51 is located on that assembly in close contact with or in proximity to it for replication, it then ends up with an authentication hologram having only the added information of the star pattern recorded in it.

Although how to fabricate monochromatic authentication holograms has so far been described, it is to be understood that if two or more wavelengths are used in the respective steps for simultaneous or separate illumination to implement recording and replication with multiple wavelengths, then the end authentication holograms could be colorized.

However, when the diffraction grating pattern master 61 is replicated in the arrangement of FIG. 10 using a plurality of different wavelengths, the angle of diffraction of diffracted light varies for each wavelength with respect to the illumination light 52 having a constant angle of incidence; the angle of inclination of the planar interference fringes of the hologram mirror pattern that is in the form of the star pattern formed in the volume hologram-recording material 51 and is based on the respective diffraction wavelengths varies for each wavelength. For this reason, as that authentication hologram keeps inclining under illumination light, the image of the 3D object O can be viewed as a color image over a wide field of vision; however, in one position where one hologram mirror pattern based on one wavelength turns in a given direction with respect to a viewer, that hologram mirror pattern gives off a momentary flash in the added information pattern of that wavelength, and in another position, another hologram mirror pattern gives off a momentary flash in the added information pattern of another wavelength. In other words, the field of vision of the hologram mirror pattern is going to be viewed in a narrow field of vision varying for each wavelength.

Figure 11:
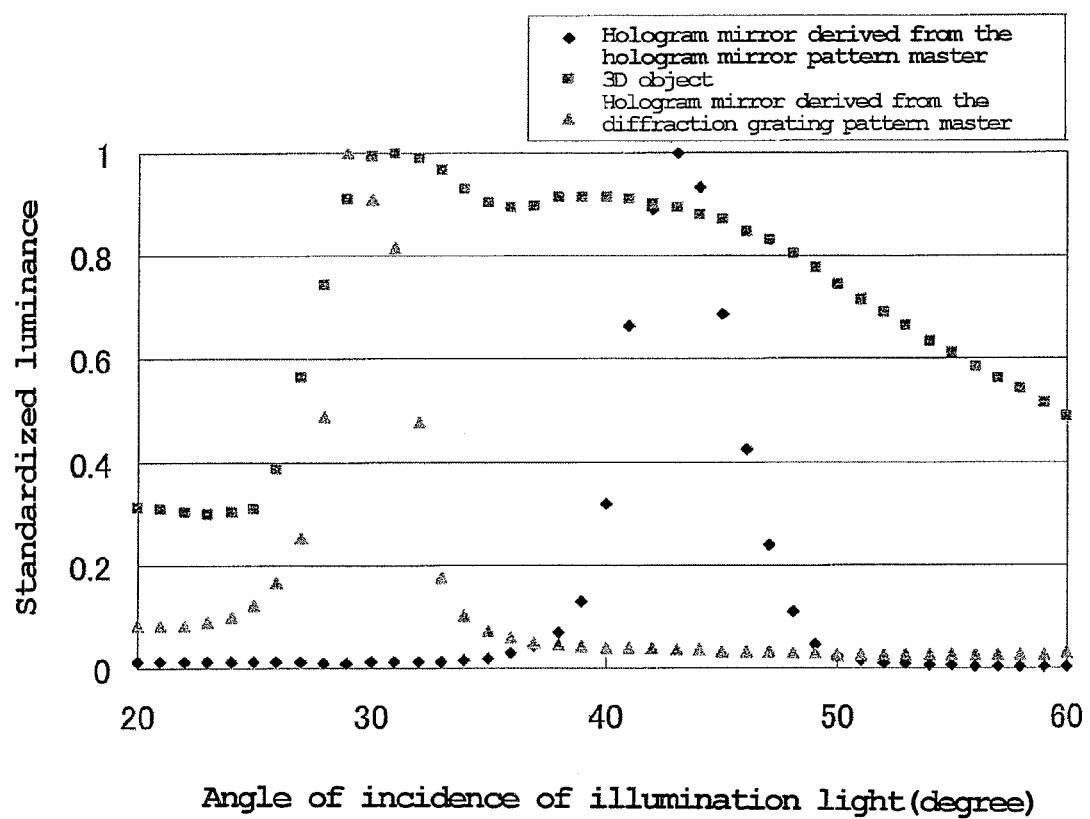
FIG. 11 is illustrative of the standardized luminances of the respective reconstructed images as viewed from the front when there are vertical changes in the angles of incidence of the reconstructing illumination light on the authentication hologram fabricated by the invention fabrication process.

FIG. 11 is indicative of the luminances of the respective reconstructed image in the case where the authentication hologram fabricated by such a fabrication process as illustrated in FIG. 10, for instance, is viewed from the front at vertically varied angles of incidence of the reconstructing illumination light (each luminance having a peak value standardized to 1). The same also holds for the case wherein the viewing angle is vertically or horizontally varied with the incidence of the reconstructing illumination light at a given angle).

Figure 12:
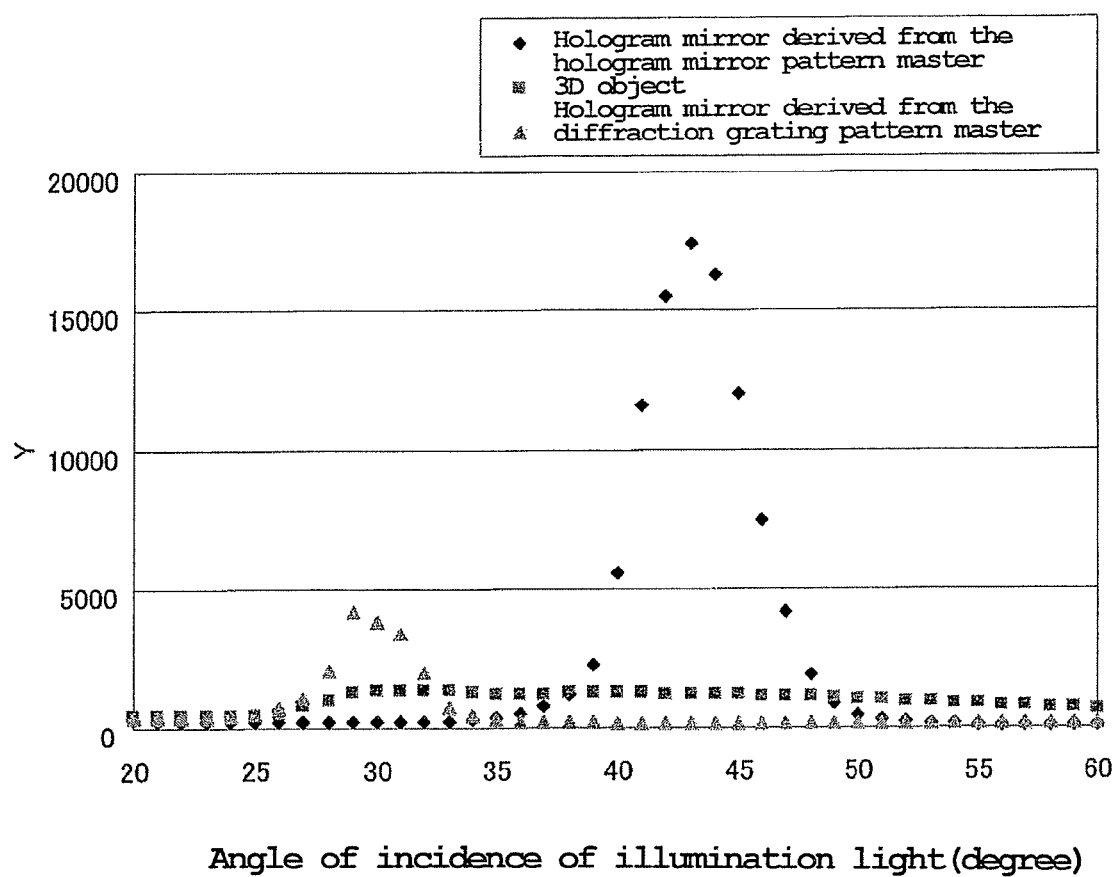
FIG. 12 is illustrative of the luminances of the respective reconstructed images of FIG. 11 without standardization but for comparison.

FIG. 12 is indicative of the luminances Y of the hologram mirror derived from the hologram mirror pattern master, the 3D object, and the hologram mirror derived from the diffracting grating pattern in FIG. 11, respectively, for comparison purposes, so without being standardized.

From FIGS. 11 and 12, it is found that the angular range (field of vision) in which the hologram mirror pattern derived from the hologram mirror pattern master is viewed and the angular range (field of vision) in which the hologram mirror pattern derived from the diffraction grating pattern master is viewed are much narrower than the angular range (field of vision) in which the reconstructed image of the 3D object is viewed, but that the luminance of the hologram mirror pattern derived from the hologram mirror pattern master is the highest, and the luminance of the hologram mirror pattern derived from the diffraction grating pattern master is the second highest, both much higher than that of the reconstructed image of the 3D object. In the hologram fabricated by the inventive process, accordingly, the added information may be viewed with high luminance at a specific angle alone, so that the viewer can easily learn which information corresponds to the added information: whoever the viewer is will be able to implement authentication with great ease.

To visually tell the hologram mirror pattern derived from the hologram mirror pattern master, and the hologram mirror pattern derived from the diffraction grating pattern master from the reconstructed image of the 3D object, by the way, the following condition (1) may hold true between the luminance of the hologram mirror pattern derived from any of the hologram mirror pattern master and the diffraction grating pattern master.

Figure 13:
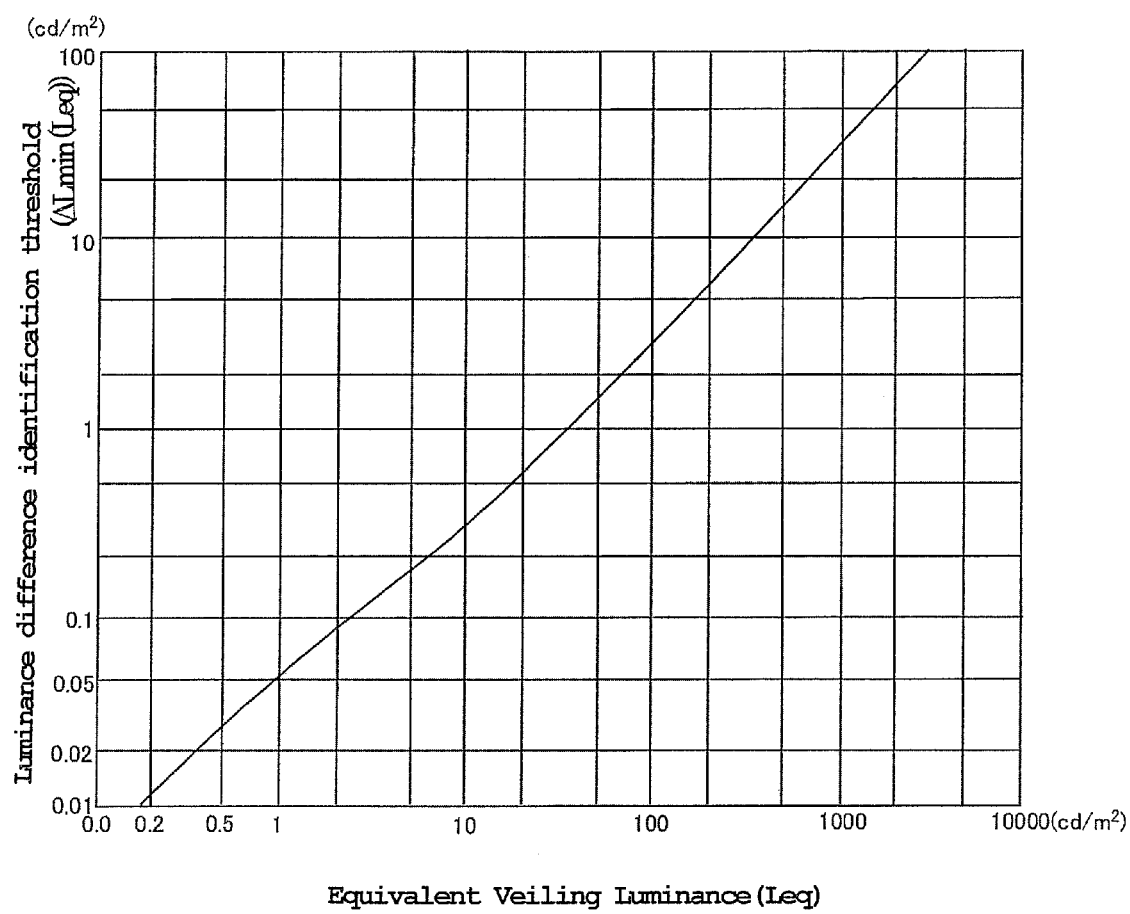
FIG. 13 is illustrative of a luminance difference identification threshold.

{(luminance of the hologram mirror pattern)(luminance of the reconstructed image of the 3D object)}/(luminance difference identification threshold)≥1     (1)

where the luminance difference identification threshold is given by $\Delta L_{min}$ (Leg) in FIG. 4 of Patent Publication 2 for instance, and represented by the curve of FIG. 13.

Figure 14:
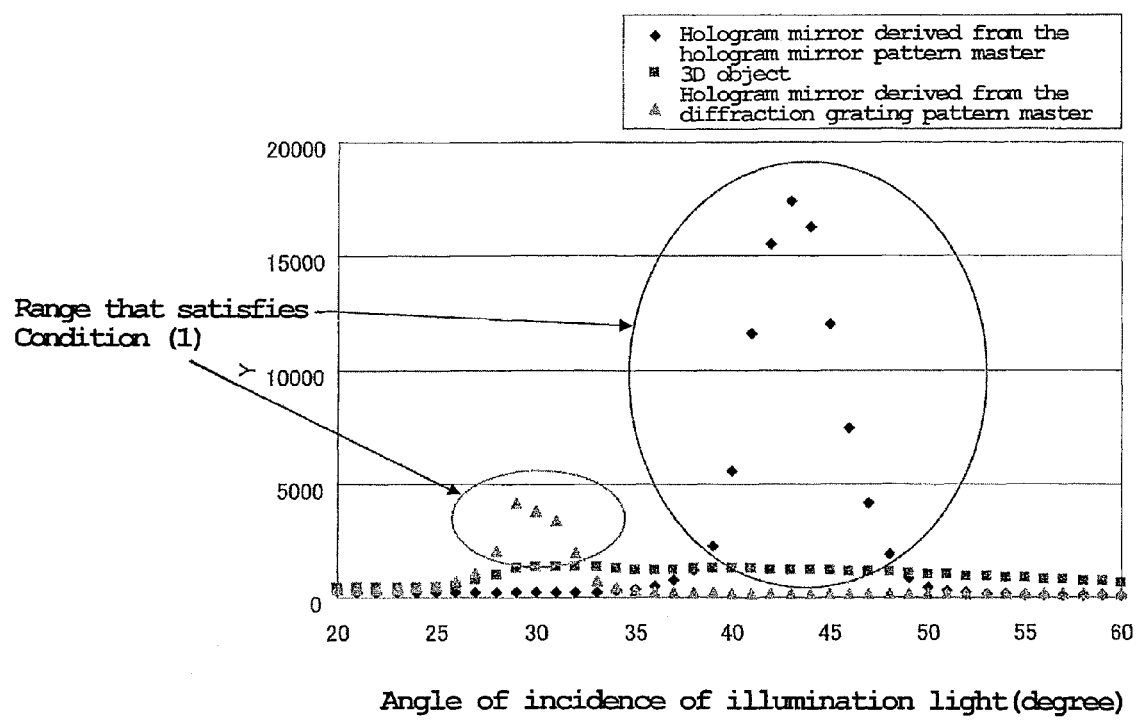
FIG. 14 is illustrative of a range that satisfies Condition (1) in the case of FIG. 12.

FIG. 14 is indicative of the range in which Condition (1) is satisfied in the case of FIG. 12, revealing that both the hologram mirror pattern derived from the hologram mirror pattern master and the hologram mirror pattern derived from the diffraction grating pattern master can be visually identified from the reconstructed image of the 3D object.

While the inventive authentication hologram and its fabrication process have so far been explained with reference to some specific examples, it is to be understood that the invention is in no sense limited thereto, and various modifications may be made. While the invention has been explained with reference to using a 3D object as the subject, it is as a matter of course that a planar diffuse object may also be used as the subject.

APPLICABILITY TO THE INDUSTRY

Taking advantages of the inventive authentication hologram over conventional ones in which there is a vertical and horizontal field of vision in the Lippmann hologram, the added information can be viewed at a specific angle alone, so that the viewer can easily learn which information corresponds o the added information, and so the whoever the viewer is will be able to implement authentication with great ease.

What we claim is:

1. An authentication hologram fabrication process, comprising:
    directing illumination light to a first-stage hologram in which interference fringes of scattered from and reflected off a 3D object and first reference light are recorded to generate diffracted light thereby reconstructing an image of the 3D object;
    letting the diffracted light and second reference light co-entered in a second-stage hologram-recording material positioned near the reconstructed image of the 3D object to prepare a second-stage hologram as a 3D object hologram master;
    locating a diffraction grating pattern master in which an added information pattern portion is added to a transparent film as a constant-pitch diffracting grating in close contact with the 3D object hologram master into an assembly and locating another hologram-recording material above or below the assembly; and
    directing illumination light to a side of the another hologram-recording material to cause diffracted light from the diffraction grating pattern master and the 3D object hologram master and the directed illumination light to interfere in the another hologram-recording material,
    wherein a field of vision of the image of the 3D object is formed wider than a field of vision of a hologram mirror pattern of the first-stage hologram,
    a luminance of the hologram mirror pattern of the first-stage hologram is formed higher than a luminance of the image of the 3D object, and
    [(the luminance of the hologram mirror pattern)−(luminance of the reconstructed image of the 3D object)]/(luminance difference identification threshold)≥1 is satisfied between the luminance of the hologram mirror pattern derived from any of the hologram mirror pattern master and the diffraction grating pattern master to visually recognize the hologram mirror pattern derived from a hologram mirror pattern master, and the hologram mirror pattern derived from the diffraction grating pattern master from the reconstructed image of the 3D object.

2. An authentication hologram fabrication process as recited in claim 1, wherein
    the 3D object hologram master is prepared using light of two or more different wavelengths, and
    light of two or more different wavelengths used as the illumination light entered from the side of the another hologram-recording material for illumination is concurrently or separately directed to cause interferences in the another hologram-recording material.

* * * * *